United States Patent [19]

Webster

[11] Patent Number: 4,507,424
[45] Date of Patent: Mar. 26, 1985

[54] COMPOSITIONS USEFUL FOR RESTORING GROUT

[75] Inventor: Daniel R. Webster, St. Louis Park, Minn.

[73] Assignee: C.T.R. Inc., St. Louis Park, Minn.

[21] Appl. No.: 614,489

[22] Filed: May 29, 1984

[51] Int. Cl.$^3$ ............... B08B 7/00; C09D 3/80; C11D 3/14; C11D 7/02
[52] U.S. Cl. .................................. 524/442; 134/4; 427/154; 523/122; 524/424; 524/425
[58] Field of Search ............... 134/4; 427/154; 523/122; 524/424, 425, 442

[56] References Cited

U.S. PATENT DOCUMENTS

| | | | |
|---|---|---|---|
| 3,827,983 | 8/1974 | Mitchell et al. | 134/4 |
| 3,994,744 | 11/1976 | Anderle et al. | 134/4 |
| 4,028,261 | 6/1977 | Petersen et al. | 252/89 R |
| 4,055,529 | 10/1977 | Burley | 523/122 |
| 4,130,442 | 12/1978 | Petersen et al. | 524/560 |
| 4,203,859 | 5/1980 | Kirn et al. | 134/4 |
| 4,239,541 | 12/1980 | Marek et al. | 523/122 |

Primary Examiner—Ronald W. Griffin
Attorney, Agent, or Firm—Merchant, Gould, Smith, Edell, Welter & Schmidt

[57] ABSTRACT

An alkaline liquid composition is disclosed which is useful for restoring grout. The composition consists essentially of an aqueous dispersion of a film-forming polymeric resin, a compatible surfactant, a basic alkali metal salt, sodium hypochlorite, pigment, and an amount of zinc oxide effective to set the composition when it is coated onto and absorbed by the porous grout.

9 Claims, No Drawings

COMPOSITIONS USEFUL FOR RESTORING GROUT

FIELD OF THE INVENTION

The present invention is directed to compositions effective to clean, seal, color, disinfect and strengthen grout which has become stained, discolored and weakened by the effects of environmental pollution and prior cleaning treatments with harsh chemical compositions.

BACKGROUND OF THE INVENTION

The term "grout" is commonly applied to the thin, wet mortar which is pourable and used for filling structural gaps such as the joints between units of masonry, tile, brick or stone used to cover household and institutional surfaces, e.g. in bathrooms, kitchens, terraces and the like. Grout is usually formed of a mixture of cement, lime or gypsum plaster, with sand and enough water to render the mixture flowable and plastic. The wet grout is then pressed into the joints or gaps between the tiles and allowed to harden so as to form a connective matrix between the individual tiles.

Although the initial plasticity of the grout renders it easy to handle, the evaporation of the water from the grout which occurs during the hardening process leaves a open crystalline matrix which renders the body of the grout porous and which readily absorbs environmental pollutants such as cooking fat, tobacco smoke, body oils, exhaust fumes and the like. Besides discoloring the grout and rendering it unattractive, the acidic components of these soils also weaken the cyrstalline matrix of the grout thus further increasing its porosity which in turn speeds the discoloration and decomposition processes already begun.

Compositions intended to renew the discolored or damaged surface of grout have generally fallen into two classes. The first class of compositions intended to clean grout use harsh acids, such as hydrochloric acid, which, while they may be effective to remove the alkaline soils, also dissolve a portion of the basic grout matrix during the cleaning process and further increase its porousity.

A second class of compositions include those such as colored chalks or pastes which are spread over the surface of the grout and are intended to recolor it. Such compositions neither clean the grout nor repair the damaged matrix of the grout and at best offer only a temporary solution to the discoloration of the grout.

One approach to recoloring discolored or stained grout is found in U.S. Pat. No. 4,130,442 which discloses applying to the grout a pigmented polymeric dispersion which forms a water resistant coating on the grout. Although this patent discloses a method to color the surface of discolored grout, it does not address the problem of corrosive pollutants absorbed into the body of the grout and the damage which results from exposure of the grout to such pollutants.

Therefore, a need exists for compositions which will counteract the damage caused by environmental pollutants, particularly those of acidic nature, and which also function to restore the color and texture of the surface of the grout to which they are applied.

BRIEF DESCRIPTION OF THE INVENTION

The present invention provides alkaline aqueous compositions useful for restoring grout, which compositions consist essentially of solutions of certain inorganic bases and sodium hypochlorite having dispersed therein a film-forming polymeric resin and a compatible surfactant. The compositions will also incorporate a pigment and an amount of zinc oxide effective to bind the composition to the grout when it is applied to the grout and dried.

In use the present compositions will both coat the surface of the grout as well as partially penetrate its porous crystalline matrix. In addition to acting as surface cleaning agents, the basic metal salts which are incorporated into the present compositions are also selected so as to be compatible with the crystalline mineral matrix of the grout which typically comprises metal carbonates, oxides and/or silicates. After the excess of the applied composition has been removed from the grout and the composition has dried and set, the basic metal salts along with the zinc oxide act to firmly bind the polymeric film to the surface of the grout, thus imparting a lasting colored surface thereto. Additionally, the metal salts are deposited within the pourous crystalline matrix of the grout body where they can act to reinforce it as well as to neutralize corrosive acids such as those deposited from tobacco smoke, acidic tile cleaners, automobile exhaust and the like.

As used with respect to grout, the term "restore" is intended to refer to the cleaning, coloring, texturing and strengthening effects imparted by the present compositions. As applied to zinc oxide, the term "set" is intended to refer both to the action of the oxide in hardening the surface film of the composition on the grout as well as to its effect of binding the composition firmly to the crystalline matrix of the grout.

DETAILED DESCRIPTION OF THE PRESENT INVENTION

The present compositions are formed by dissolving effective amounts of basic alkali metal salts in aqueous dispersions of film-forming polymeric resins (latexes). The latexes will also include effective amounts of dispersed or dissolved pigment and sufficient dispersed zinc oxide to effectively set the compositions when they are spread over the grout surface and allowed to penetrate into the body of the grout.

The present compositions will also incorporate one or more surfactants chemically compatible with the dispersed polymeric resin and an effective biocidal amount of sodium hypochlorite which also can act to decolor the soiled grout by its bleaching action.

DISPERSED POLYMERIC RESINS

The present compositions are based on aqueous dispersions of film-forming polymeric resins which may be selected from any of the water-dispersible resins commonly used to bind pigments into coherent films. A number of these water-based resin dispersions are commercially available and typically comprise about 40–80% dispersed polymeric solids, most typically about 35–65% solids.

Resins useful as film formers in the present composition may be selected from vinyl acetate acrylate copolymers, polyvinyl acetate copolymers, acrylates copolymers, acrylic acrylate copolymers, styrene-acrylate copolymers and the like. The term "acrylate" as used herein is intended to refer to the (lower)alkyl esters of acrylic acid or methacrylic acid. Preferred in the practice of the present invention are the styrene-acrylate copolymers and the acrylates copolymers. On a dry basis, about 5–25%, preferably about 10–20% by weight of the polymeric resins will be incorporated into the present compositions.

SURFACTANTS

Whether purchased from commercial sources or compounded by the user, the latexes useful in the present invention will incorporate an amount of surfactant which is both chemically compatible with the dispersed resins and effective to hold them is suspension. Depending on the type of resin to be dispersed in the aqueous base, it may be preferable to employ a cationic, anionic, nonionic, or amphoteric surfactant. Of these surfactant classes, the nonionic type will most often be employed in the practice of the present invention. Useful nonionic surfactants include the condensation products of ethylene oxide with a hydrophobic polyoxyalkylene base formed by the condensation of propylene oxide with propylene glycol, the condensation products of $C_8-C_{22}$ alkyl alcohols with 2-50 moles of ethylene oxide per mole of alcohol, the ethylene oxide ethers of $C_6-C_{12}$ alkylphenols such as the nonylphenoxy polyoxyethylene ethers, the ethylene oxide ethers of alkyl mercaptans, the ethylene oxide esters of acids such as fatty acids, the ethylene oxide ethers of fatty acid amides, and the benzoates of fatty alcohols. Preferred nonionic surfactants for use in the present compositions include the fatty acid-, fatty alcohol- and/or (lower)polyoxyalkylene ethers or alkoxylates of $C_2-C_{10}$ polyols comprising from about 2-5 free hydroxyl groups on the polyol.

One preferred water-soluble class of nonionic surfactants are the mixed polyoxyethlene, fatty acid esters of glycerol wherein the fatty acid portion preferably comprises an about 15-22 carbon chain and about 5-10 ethylenoxy moieties are present in the polyoxyethylene chain. Another useful class of nonionic surfactant is the $C_6-C_{12}$-acid diesters of propylene glycol such as propylene glycol dicaprylate, propylene glycol dicaprate, mixtures thereof, or the mixed caprate, caprylate esters. A further useful class of nonionic surfactant is the mixed fatty acid-fatty alcohol ester alkoxylates of polyoxyethylene glycol wherein the acid and alcohol components each comprise 12-18 carbon atoms, and the polyoxyethylene glycol component is made up of 2-5 ethylenoxy units.

As well as acting to disperse the particles of the polymeric resin in the aqueous phase, the surfactants also function to aid in the dispersion of greasy dirt which is absorbed on or in the body of the grout which is to be restored. Surfactant or surfactant mixtures will preferably comprise about 0.5-10%, most preferably about 1-5% by weight of the present compositions.

THICKENER

For many household or institutional applications it will be highly desirable to include an amount of an inorganic or organic thickening agent in the present compositions effective to prevent the composition from running excessively when they are coated onto nonhorizontal surfaces. To be useful in the practice of the present invention, the thickeners must be selected from those which are compatible with the latex system and with the alkaline salts used in the present composition. Useful thickeners include organic thickeners such as xanthan gum, gum arabic, and polyvinylpyrrolidone (PVP) and inorganic mineral thickeners such as smectite clays and montmorillonite minerals.

When incorporated into the present compositions, thickeners will preferably comprise about 0.25-5% by weight of the total composition.

ALKALINE SALTS

Compositions of the present invention will incorporate an amount of one or more alkaline salts effective to (a) impart detergency to the liquid compositions when they are applied to the grout surface, (b) stabilize the biocidal amount of sodium hypochloride present in the compositions, and (c) reinforce the crystalline mineral matrix of the grout if it has been attenuated by acidic soils. Preferred alkaline metal salts include sodium salts such as sodium metasilicate, sodium carbonate, sodium bicarbonate and mixtures thereof. About 5-35%, preferably about 10-30% of one or more of these basic alkaline metal salts will be dissolved in the latex used as the base of the present compositions.

When the present compositions are applied as by wiping or spraying to soiled grout, the alkaline metal salts and the surfactants present in the excess composition act to dissolve and disperse the soil present on the grout surface. The basic alkaline metal salts present in the part of the composition which penetrates into the porous structure of the grout can act to neutralize the acidic contaminants which are present therein.

In concert with the zinc oxide suspended in the composition, the basic alkaline metal salts act both to reinforce the mineral matrix of the grout and to bind the polymeric resin component to the grout matrix, presumably through ionic interactions.

A mixture of sodium carbonate and sodium bicarbonate is especially preferred for use in the compositions of the present invention. Preferably the sodium carbonate and sodium bicarbonate will be present in a weight-to-weight ratio of about 1:1. For example, about 1-10% each of sodium carbonate and sodium bicarbonate may be present.

SODIUM HYPOCHLORITE

The compositions of the present invention will also include an effective bleaching and disinfecting amount of sodium hypochlorite. In solution, the sodium hypochlorite acts to decolorize stained grout as well as to decontaminate the grout by destroying any microorganisms which may be present. After the composition has dried, the sodium hypochlorite, stabilized by the basic alkali metal salts, will exert a continuing biocidal effect throughout the body of the grout. About 1-15% by weight of sodium hypochlorite, preferably about 2-10% by weight, will be incorporated into the present compositions. Preferably the weight ratio of sodium carbonate to sodium bicarbonate to sodium hypochlorite in the present compositions will be about 1:1:1.

PIGMENT

The present compositions will also include an amount of pigment effective to color the grout to the desired shade. Useful pigments will include any of those alkali-stable pigments compatible with aqueous latexes including but not limited to titanium dioxide, talc, silica, calcium carbonate, ultramarine, malachite and the like.

The amount of pigment incorporated in the present compositions can vary widely depending upon factors such as the chemical composition of the pigment and its solubility, if any, in water. For example, about 5-20%, preferably about 10-15% of titanium dioxide will be incorporated into the present compositions when a white coloring is desired.

ZINC OXIDE

The present compositions will also include an amount of powdered zinc oxide effective to set the present compositions into coherent resilient film when they are applied to grout bodies and allowed to dry. Although organic and inorganic metal salts have been disclosed as agents useful to enhance the drying speed of polymeric films or to embrittle them so that they may be easily fractured, it has surprisingly been found that zinc oxide greatly increased the ability of the aqueous alkaline latexes to bind to the grout without overly embrittling the resulting dry coating.

Without intending to be bound by any theory, it is believed that the compatibility of the zinc oxide with the oxides present in the mineral matrix of the grout is largely responsible for the extremely firm bond formed between the compositions and the grout matrix after the setting process has been completed. The firm adherence of the set composition to the porous grout matrix provides the restored grout with a surface similar to that exhibited by freshly applied and set grout. Thus, the present compositions do not exhibit the shiny or smooth painted appearance which other film-forming grout restoration agents can impart to the grout. Furthermore, even when allowed to completely dry, the films of the present composition are easily removed from adjacent household surfaces such as glazed tile, metal or porcelain.

Also, zinc oxide possesses the advantages of being non-toxic, easily dispersible in alkaline solutions and compatible with many pigment types. Preferably about 0.5–10%, most preferably about 1–5%, by weight of finely powdered zinc oxide will be incorporated into the present compositions.

Therefore, preferred alkaline liquid compositions useful for cleaning, sealing, coloring and reinforcing grout will consist essentially of about 30–60% water, most preferably about 40–50% water; about 5–15% of a dispersed film-forming polymeric resin; a compatible surfactant; about 10–25% of one or more basic alkali metal salts; about 2–10% sodium hypochlorite; pigment; and, an amount of zinc oxide effective to set the composition. Preferably the resin will comprise a styrene-acrylate copolymer or a vinyl acetate acrylate copolymer, and the alkali metal salt will comprise a mixture of sodium bicarbonate and sodium carbonate. Minor but effective amounts of thickener, tint, suspending agent and filler may also be included.

The present compositions are preferably formed by dosing commercially available latexes with pigments, and optionally with suspending agents, tints and thickeners to yield water-based latex paints which are treated subsequently with basic alkali metal salts and sodium hypochlorite under conditions of agitation. Additional water may be added as necessary to adjust the final viscosity. The resulting grout renewal compositions are flowable, thick, opaque liquids.

The composition may be applied to the grout body to be renewed by any convenient means, e.g. by brushing, wiping or the like. After it has dried to a coherent film, the excess composition may be removed from the surrounding wall or floor areas simply by wiping with a wet sponge or rag. Additional coatings may be applied as desired, as in the case of severely stained, pitted or cracked grout.

The invention will be further described by reference to the following detailed example.

EXAMPLE I

Grout Restoring Composition

A styrene-acrylate copolymer latex (67 liters) comprising 32% by weight polmeric solids dispersed in water by a nonionic surfactant system is agitated and treated with 23.3 kg. titanium dioxide, 25.6 kg. of a 1:1 mixture of fumed silica and sodium metasilicate, and 2.6 kg. of a smectite clay thickener (Veegum ®, Vanderbilt Minerals). After the white suspension reaches homogeneity, a solution of 10.7 kg. each of powdered sodium hypochlorite, sodium carbonate and sodium bicarbonate in 28 liters of water is added, followed by 3.0 kg. of powdered zinc oxide with continued stirring. After 15.0 minutes of stirring the opaque, white suspension is screened and filled into 50, 3.8 liter cans.

About 20 ml. of the composition of Ex. I was applied to a dry 7×12 cm. cotton cloth and wiped over a 0.3 m. square area of white 12×12 cm. tiles in a shower stall. The tiles were set in a matrix of white grout which had darkened to a charcoal gray color. After two applications, the coating was allowed to set under ambient conditions for 18 hours. The excess was removed with a damp sponge.

Visual observation indicated that, while the composition had not adhered to the faucets or glazed tiles, it had penetrated and firmly adhered to the grout areas, coloring them flat white. The rough surface of the grout was not excessively overcoated. The treated grout did not bleed pigment upon application of the hot shower spray. Grout treated in this manner will not appreciably darken or mildew after several months and is easily cleansed of oils, soap scum and the like with mild detergents.

On the other hand, application of a zinc oxide-free composition prepared according to the procedure of Ex. 1 to discolored grout yielded a thin, shiney, paint-like film which was substantially removed from the grout by application of the hot shower spray or by rubbing with a sponge dampened with warm water.

While certain representative embodiments of the invention have been described herein for purposes of illustration, it will be apparent to those skilled in the art that modifications therein may be made without departing from the spirit and scope of the invention.

What is claimed is:

1. An alkaline liquid latex composition for restoring grout consisting essentially of the following:
   about 30–60% water,
   about 5–15% of a dispersed film-forming polymeric resin,
   a surfactant compatible with said resin,
   about 10–25% of an alkali metal salt selected from the group consisting of sodium metasilicate, sodium carbonate, sodium bicarbonate and mixtures thereof,
   about 2–10% sodium hypochlorite,
   pigment, and
   an amount of zinc oxide effective to set the composition when it is applied to grout and dried.

2. The composition of claim 1 which contains about 0.5–10% zinc oxide.

3. The composition of claim 2 which contains about 2–8% sodium carbonate and about 2–8% sodium bicarbonate.

4. The composition of claim 2 wherein the weight ratio of sodium carbonate:sodium bicarbonate:sodium hypochlorite is about 1:1:1.

5. The composition of claim 2 which contains about 5-15% titanium dioxide.

6. The composition of claim 1 which also contains a thickening agent.

7. The composition of claim 1 wherein the resin comprises a styrene-acrylate copolymer.

8. The composition of claim 7 wherein the surfactant comprises a nonionic surfactant.

9. A method of restoring a porous body of grout consisting essentially of applying a coating of the composition of claim 1 to the surface of the porous grout, allowing the composition to penetrate the grout pores and substantially set, and removing the excess composition to provide the grout with a coherent, firmly bound coating of the composition.

* * * * *